(No Model.) 2 Sheets—Sheet 1.

N. TESLA.
APPARATUS FOR PRODUCING OZONE.

No. 568,177. Patented Sept. 22, 1896.

Witnesses:
Raphaël Netter
Drury W. Cooper

Nikola Tesla, Inventor
by Kerr, Curtis & Page
Att'ys.

(No Model.) 2 Sheets—Sheet 2.

N. TESLA.
APPARATUS FOR PRODUCING OZONE.

No. 568,177. Patented Sept. 22, 1896.

Witnesses:
Raphaël Netter
Drury W. Cooper

Nikola Tesla, Inventor
by Kerr, Curtis & Page
Att'ys.

UNITED STATES PATENT OFFICE.

NIKOLA TESLA, OF NEW YORK, N. Y.

APPARATUS FOR PRODUCING OZONE.

SPECIFICATION forming part of Letters Patent No. 568,177, dated September 22, 1896.

Application filed June 17, 1896. Serial No. 595,927. (No model.)

*To all whom it may concern:*

Be it known that I, NIKOLA TESLA, a citizen of the United States, residing at New York, in the county and State of New York, have invented certain new and useful Improvements in Apparatus for Producing Ozone, of which the following is a specification, reference being had to the drawings accompanying and forming a part of the same.

The invention subject of my present application has primarily as its object to provide a simple, cheap, and effective apparatus for the production of ozone or such gases as are obtained by the action of high-tension electrical discharges, although in the application to such purposes of the apparatus heretofore invented by me and designed for the production of electric currents of high frequency and potential I have made certain improvements in such apparatus itself which are novel and useful in other and more general applications of the same. I have heretofore shown and described, notably in Patents No. 462,418, dated November 3, 1891, and No. 454,622, dated June 23, 1891, an apparatus devised for the purpose of converting and supplying electrical energy in a form suited for the production of certain novel electrical phenomena which require currents of higher frequency and potential than can readily or even possibly be developed by generators of the ordinary types or by such mechanical appliances as were theretofore known. This apparatus involved means for utilizing the intermittent or oscillating discharge of the accumulated electrical energy of a condenser or a circuit possessing capacity in what may be designated the "working" circuit or that which contains the translating devices or means for utilizing such currents. In my present improvement I have utilized appliances of this general character under conditions and in combination with certain instrumentalities, hereinafter described, which enable me to produce, without difficulty and at very slight expense, ozone in any desired quantities. I would state the apparatus which I have devised for this purpose is capable of other and highly important uses of a similar nature, but for purposes of the present case I deem it sufficient to describe its operation and effects when used for the purpose of generating ozone.

Figure 1:
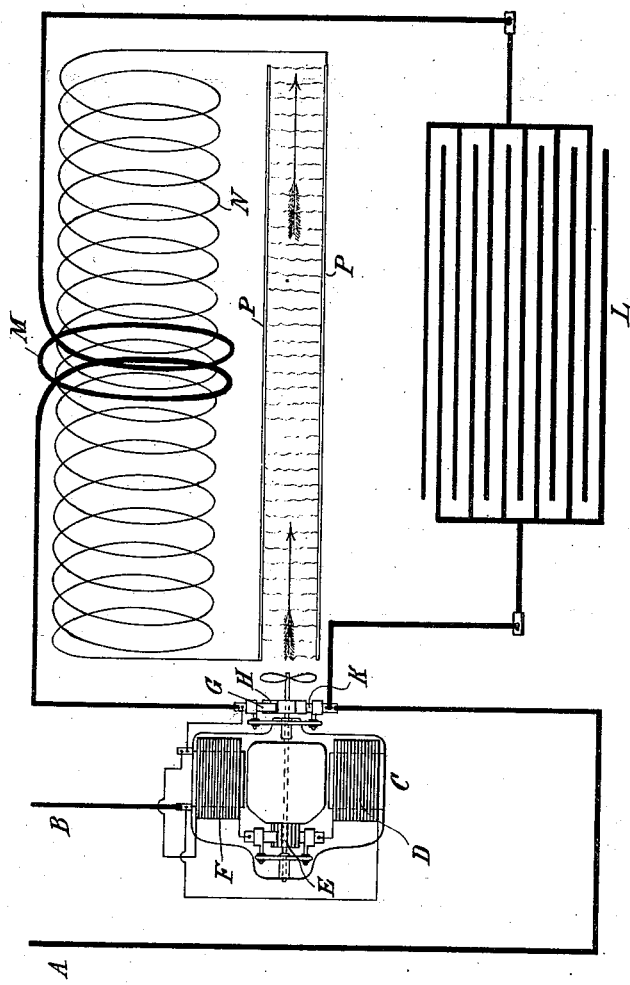
Figure 2:
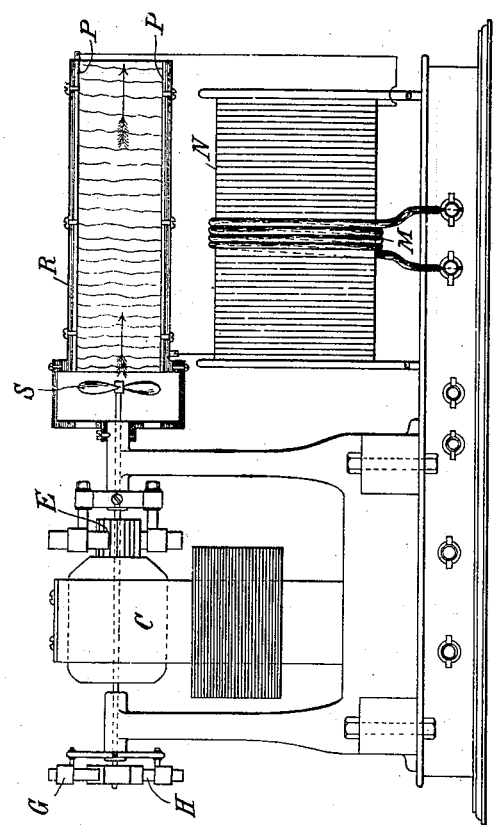

In the accompanying drawings, illustrative of the principle of construction and mode of operation of my improvement, Figure 1 is a diagrammatic illustration of the invention; and Fig. 2, a view, partly in side elevation and partly in section, of the apparatus as I construct it for practical use.

The device hereinafter described is especially designed for direct application to and use with existing circuits carrying direct currents, such as the ordinary municipal incandescent-lighting circuits.

Let A B designate the terminals from any given circuit of this character. In such circuit I connect up an electromagnetic motor C in any of the usual ways. That is to say, the coils of the field and armature may be in series or derivation or wholly independent, and either or both are connected up in the circuit. In the present instance one terminal, as B, is connected to one of the binding-posts, from which the circuit is led through one field-coil, D, the brushes and commutator E, the other field-coil, F, and thence to a brush G, which rests upon a circuit-controller H, consisting in general of a conducting disk or cylinder with insulating-sections in its periphery. The other terminal, as A, connects with a second brush K, bearing on the controller, so that the current which passes through and operates the motor is periodically interrupted. For this reason the iron cores of the motor should be laminated. Around the controller is formed a circuit of low self-induction, which includes a condenser L and the primary M of a transformer. The circuit including the motor is of relatively high self-induction, and this property is imparted to it by the coils of the motor, or, when these are not sufficient, by the addition of suitable choking-coils, so that at each break of the motor-circuit a current of high electromotive force will be developed for charging the condenser, which may therefore be small and inexpensive. The condenser discharges through the circuit which is completed through the brushes G K and the controller H, and since the self-induction of this circuit, as well as the capacity of the condenser itself, may be given practically any desired value the frequency of the discharge-current may be adjusted at will. The potential of the high-frequency discharge-current is raised by a secondary coil N in inductive relation to the primary M. The conductors of such secondary circuit are connected to two insulated conducting-plates P P, and when the apparatus is in operation a discharge in the form of streams will be maintained between such plates, as indicated by the wavy lines in the figures. If air be forced between the plates P during this discharge, the effectiveness of the apparatus is increased and ozone is generated in large quantities. In order to secure this result, I inclose the said plates P P in a casing R of any proper description, through which a current of air is maintained by a fan S, mounted on the shaft of the motor.

This apparatus may be constructed and combined in very compact form and small compass. Its operation involves but a small expenditure of energy, while it requires practically no care or attention for the continued production of ozone in unlimited amount.

What I claim as my invention is—

1. The combination with a circuit of direct currents, of a controller for making and breaking the same, a motor included in or connected with said circuit so as to increase its self-induction, and driving the said controller, a condenser in a circuit around the controller, and a transformer through the primary of which the condenser discharges, as set forth.

2. The combination with a circuit of direct currents, of a controller for making and breaking the same, a series-wound motor having its coils included in said circuit and driving the said controller, a condenser connected with the circuit around the point of interruption therein, and a transformer, the primary of which is in the discharge-circuit of the condenser, as set forth.

3. A device for producing ozone comprising in combination, surfaces between which an electrical discharge takes place, a transformer for producing the potential necessary for such discharge, a condenser in the primary circuit of the transformer, a charging-circuit, means for charging the condenser by such circuit and discharging it through the primary of the transformer, and a device for maintaining a current of air between the discharge-surfaces, as set forth.

4. A device for producing ozone comprising in combination, surfaces between which an electrical discharge takes place, a transformer for producing the potential necessary for such discharge, a condenser in the primary circuit of the transformer, a charging-circuit, means for charging the condenser by such circuit and discharging it through the primary of the transformer, a motor operated by the charging-circuit, and a device operated thereby for maintaining a current of air between the discharge-surfaces, as set forth.

5. A device for producing ozone comprising in combination, surfaces between which an electrical discharge takes place, a transformer for producing the potential necessary for such discharge, a condenser in the primary circuit of the transformer, a charging-circuit, a circuit-controller effecting the charging and discharging of the condenser, and a fan-motor connected with the charging-circuit and operating the circuit-controller and adapted to maintain a current of air between the discharge-surfaces, as set forth.

6. A device for producing ozone comprising in combination, means for charging a condenser, a circuit of low self-induction and resistance into which the condenser discharges, a coil for raising the potential of such discharge, and means for passing a current of air through the high-potential discharge, as set forth.

NIKOLA TESLA.

Witnesses:
DRURY W. COOPER,
M. LAWSON DYER.